United States Patent [19]
Sexton et al.

[11] 3,878,227
[45] Apr. 15, 1975

[54] PROCESS FOR MAKING TERT.-BUTYL GLYCIDYL ETHER

[75] Inventors: Arthur R. Sexton; Frederick P. Corson, both of Midland, Mich.

[73] Assignee: The Dow Chemical Company, Midland, Mich.

[22] Filed: Dec. 7, 1973

[21] Appl. No.: 422,806

[52] U.S. Cl.............................. 260/348.6; 260/615 R
[51] Int. Cl................................................ C07d 1/18
[58] Field of Search ................................. 260/348 R

[56] References Cited
UNITED STATES PATENTS
2,538,072  1/1951  Zech ............................... 260/348 R
3,743,679  7/1973  Hickner et al. ................. 260/348 R OTHER PUBLICATIONS
Ulbrich et al., Chem. Abstr. 61, 3049 (1964).

Primary Examiner—Norma S. Milestone
Attorney, Agent, or Firm—Chessie E. Rehberg

[57] ABSTRACT

The reaction of isobutylene with a glycerol monohalohydrin produces a mixture of tert.-butyl ethers of the halohydrin. Treatment of this mixture with a dehydrohalogenating agent converts the 1-butoxy-3-halo-2-propanol to the butyl glycidyl ether but does not affect the 2-butoxy-3-halo-1-propanol or the 1,2-dibutoxy-3-propyl chloride. The latter two materials can then be recycled to the process and ultimately converted.

4 Claims, No Drawings

PROCESS FOR MAKING TERT.-BUTYL GLYCIDYL ETHER

BACKGROUND OF THE INVENTION

Evans and Edlund, Ind. Eng. Chem., 28 1186 (1936) and U.S. Pat. Nos. 1,968,033 and 1,968,601, disclose that certain tertiary olefins readily react with primary alcohols in the presence of acid catalysts to produce the corresponding tert.-alkyl ethers of the alcohol.

Leum and Macuga, U.S. Pat. No. 2,480,940 disclose the use of acidic ion exchange resins as the catalyst in the reaction of tertiary olefins with alcohols.

Ulbrich et al., Chem. Abstr. 61, 3049 (1964) describe the preparation of tert.-butyl glycidyl ether by 1. reacting tert.-butyl alcohol with epichlorohydrin to produce 1-tert.-butoxy-3-chloro-2-propanol and
2. treating the intermediate with NaOH. Their overall yield was about 76%.

No other record has been found of the preparation of a tert.-alkyl glycidyl ether.

SUMMARY OF THE INVENTION

According to the invention, tert.-butyl glycidyl ether is prepared in good yield from inexpensive and readily available materials by a process wherein 1. isobutylene is reacted with a glycerol α-monohalohydrin, thus to produce essentially a mixture of 1-, 2- and 1,2-tert.-butyl ethers of the halohydrin,
2. the mixture of ethers from (1) is reacted with a dehydrohalogenating agent, thus to convert the 1-ether to tert.-butyl glycidyl ether, while leaving essentially unchanged the 2- and the 1,2-ethers and
3. the tert.-butyl glycidyl ether is separated and the other two ethers are recycled to Step (1).

Among the advantages of the above process are the following:

a. no tertiary butanol, a relatively expensive material, is needed,
b. separation of the mixed ethers produced in Step (1) is not necessary before proceeding to Step (2),
c. in Step (2) it is unexpectedly found that the ring closure of the 1-ether is highly selective and can be effective essentially completely with only slight reaction of the 2-ether, and
d. the undesired 2- and 1,2-ethers of the halohydrin can be recycled to Step (1) and thus converted essentially completely to the desired glycidyl ether.

DETAILED DESCRIPTION OF THE INVENTION

The reactions involved in the process can be exemplified as follows:

In Step (1) the predominant product is I, with a minor amount of III and even less of II.

The preferred glycerol monohalohydrins are the chloro- and bromohydrins, the former being favored because of its lower cost.

In Step (2) the dehydrohalogenating agent may be any conventional agent that is useful for converting a vicinal halohydrin to the corresponding epoxide. As a practical matter, the alkali and alkaline earth metal hydroxides, particularly sodium hydroxide, are preferred.

Step (1) is conveniently conducted at a temperature of about 50°–60°C. and at least the autogenous pressure, using about 1.0–1.25 moles of isobutylene per mole of monohalohydrin and an acid catalyst, such as a sulfonic acid or a strong acid ion exchange resin. Suitable catalysts include benzenesulfonic acid, toluenesulfonic acid, isethionic acid and Dowex resin 50 WX8–H. Although the reaction is reversible, it is not feasible to drive it to completion by use of a large excess of isobutylene because this results in a great increase in the production of the diether, III. When about 10% excess is used, the conversion of the monohalohydrin is usually about 80–85%. By recycling the unused material and the by-product ethers, the yield of the desired ether, I, is raised to about 90%.

Step (2) is suitably conducted at about ordinary ambient temperature (20°–30°C.) and with a slight excess (105–110% of theory) of dehydrohalogenating agent. The latter is preferably aqueous NaOH of about 15–25% by weight concentration. While the entire crude product from Step (1) can be used in Step (2), it is usually preferred to first separate the unconverted glycerol monochlorohydrin from the mixture. This can be conveniently done by extraction with water. The extracted water-soluble material, after removal of the water, is recycled to Step (1).

The course of the reaction can be followed by analyzing the reaction mixture for unreacted tert.-butyl 3-chloro-2-hydroxy-1-propyl ether. When this has substantially disappeared, the mixture is allowed to separate into aqueous and organic phases and the latter is separated and distilled to obtain the final product, tert.-butyl glycidyl ether. The fractions containing 2-butoxy-3-chloro-1-propanol and 2,3-dibutoxy-1-chloropropane can be recycled to Step (1) and ultimately converted to the desired ether.

The practice of the invention is illustrated by the following examples.

Step (11) Reaction of Isobutene with Glycerol α-Monochlorohydrin

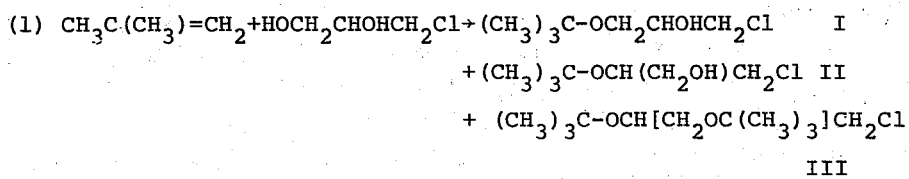

(1) $CH_3C(CH_3)=CH_2 + HOCH_2CHOHCH_2Cl \rightarrow (CH_3)_3C-OCH_2CHOHCH_2Cl$  I $+ (CH_3)_3C-OCH(CH_2OH)CH_2Cl$  II $+ (CH_3)_3C-OCH[CH_2OC(CH_3)_3]CH_2Cl$

III

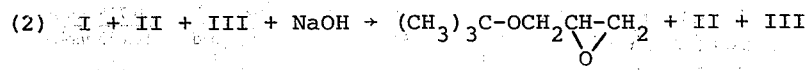

(2) $I + II + III + NaOH \rightarrow (CH_3)_3C-OCH_2\underset{\underset{O}{\diagdown\diagup}}{CH-CH_2} + II + III$

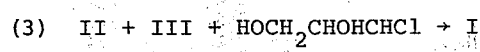

(3) $II + III + HOCH_2CHOHCHCl \rightarrow I$

A series of experiments was run wherein the reaction temperature was 50°–60°C. and the reaction was continued until the composition of the reaction mixture became essentially constant (about 6 to 8 hours). The mixture was then analyzed for the following four components:

A. Unreacted monochlorohydrin
I. 1-Butoxy-3-chloro-2-propanol
II. 2-Butoxy-3-chloro-1-propanol
III. 1,2-Dibutoxy-3-chloropropane The results are summarized in Table I. The products are reported as moles of each component per mole of A fed to the reaction.

TABLE I

| Example | Catalyst* | Isobutylene, % of Theory | Products, Moles per Mole of (A) Fed | | | |
|---------|-----------|--------------------------|------|------|------|------|
|         |           |                          | A    | I    | II   | III  |
| 1       | PTSA      | 110                      | 0.145 | 0.612 | 0.036 | 0.166 |
| 2       | "         | 120                      | .231 | .573 | .024 | .111 |
| 3       | "         | 125                      | .170 | .558 | .058 | .219 |
| 4       | Dowex     | 100                      | .115 | .680 | .025 | .107 |
| 5       | "         | 110                      | .92  | .614 | .039 | .147 |

*p-Toluenesulfonic acid (0.2% by wt. based on (A) fed)
Dowex resin 50 WX8-H (1.2% by wt. based on (A) fed)

In other experiments similar to those above, it was found that isethionic acid was essentially equivalent to PTSA as a catalyst.

EXAMPLE 6

A series of pilot plant runs was made in which the glycerol α-monochlorohydrin (A) used was made in situ by the reaction of water with epichlorohydrin. After the reaction with isobutylene, the unreacted (A) was extracted with water and recycled to the process. The runs were made as follows:

Run No. 1

The kettle was charged with 43 gals. of deionized water, 200 g. of p-toluenesulfonic acid monohydrate and the kettle closed to the atmosphere. The mixture was heated to 75°C. and 185 lbs. of epichlorohydrin pumped in at 75°–90°C. over a period of 4 hours. Occasional cooling was required to control the temperature. The mixture was held at 90°C. an additional 2 hours. A sample was analyzed by VPC and showed no unreacted epichlorohydrin.

The contents of the kettle were cooled to 50°C. and the water distilled off at 100 mm. Hg abs. and finally at 20 mm. Hg while slowly increasing the kettle temperature to 90°C. This required 6 hours.

The kettle contents were cooled to 50°C. and 112 lbs. (2 moles) of isobutylene added at 50°–60°C. and 30–40 p.s.i.g. over a period of 7.5 hours. The temperature was then held at 50°–60°C. an additional 6 hours. There was no pressure drop during the last 3 hours.

The kettle contents were cooled to 25°C. and 175 lbs. of toluene added followed by 10 gals. of deionized water. The mixture was agitated for 5 minutes after adding the water and then allowed to settle for ½ hour. The aqueous phase was drained and the washing operation repeated 3 more times. The wash waters (369 lbs.) contained 13% organic (48 lbs.), 93% or 44.5 lbs. of which was glycerine monochlorohydrin, the remainder being polymer. This wash water was saved for the next run.

The oil layer was topped at 100 mm. Hg absolute up to a pot temperature of 100°C. to remove the toluene.

The toluene distillate weighed 185 lbs. and contained 5.2% or 9.63 lbs. of combined mono- and diethers. This was saved for recycle in the next run.

The residual oil weighed 243.5 lbs. and analyzed by VPC as follows:

| Compound | Lbs. |
|----------|------|
| Toluene  | 0.95 |
| I        | 158.9 |
| II       | 16.5 |
| III      | 51.9 |
| Polymer  | 15.32 |
| Total    | 244.67 |

Run No. 2

The reactor was charged with the wash water from the above run which contained the recovered glycerine monochlorohydrin (0.4 lb. mole), 200 g. of fresh p-toluenesulfonic acid and 15.5 gals. of deionized water which made a total of 25 lb. moles of water. Epichlorohydrin (194 lbs. or 2.1 lb. moles) was added as before over a 5 hour period.

The remainder of the reaction was carried out as before adding 2.5 lb. moles of isobutylene.

The wash waters weighed 415.5 lbs. and contained 81 lbs. of glycerine monochlorohydrin and 7 lbs. of polymer. This was again saved for the next run.

The toluene distilate contained 3.47 lbs. of 1-tert.-butoxy-3-chloro-2-propanol, only a trace of the 2-isomer and diether. This was saved for the next run.

The residue weighed 296 lbs. and assayed as follows by VPC:

| Compound | Lbs. |
|----------|------|
| Toluene  | 17.76 |
| I        | 193.58 |
| II       | 21.49 |
| III      | 43.00 |
| Polymer  | 20.16 |
| Total    | 295.99 |

A total of 6 runs were made as outlined above. A summary of the runs is shown below based on VPC analysis:

Summary

| | | |
|---|---|---|
| Epichlorohydrin added | 1048 lbs. = | 11.33 moles |
| Glycerine Monochlorohydrin Recovered | 79 lbs. | 0.715 moles |
| Epichlorohydrin consumed | | 10.615 moles |

| Obtained | Lbs. | Moles |
|----------|------|-------|
| I        | 1253 | 7.53  |
| II       | 110  | 0.66  |
| III      | 298  | 1.34  |
| Polymer  | 115  | —     |
| Total    | 1776 | 9.53  |

Since II and III can be recycled as demonstrated in the following experiment, the yield of I = 9.53 × 100/10.615 = 89.7%.

Transalkylation of 2-tert.-butoxy-3-chloro-1-propanol II and the Diether III

A 1500 g. sample of the above materials consisting of 80% diether III (5.4 moles), 20% 2-tert.-butoxy-3-chloro-1-propanol II (1.82 moles) was mixed with 800 g. (7.25 moles) of glycerine monochlorohydrin and 10 g. of p-toluene-sulfonic acid and heated at 95°–98°C. for 2 hours.

The resulting mixture was cooled, mixed with 1500 cc. of toluene and the diluted mixture extracted 3 times with 500 cc. of water each time. The water layer on distillation gave 422 g. (3.82 moles) of glycerine monochlorohydrin.

The oil layer on being distilled gave 7.65 moles of 1-tert.-butoxy-3-chloro-2-propanol I, 0.75 moles of 2-tert.-butoxy-3-chloro-1-propanol II and 1.12 moles of diether III. Thus, 59% of II and 79% of III were converted to I. Most of the remainder could be converted by further recycling.

Step (2) Reaction of 1-Tert.-Butoxy-3-Chloro-2-Propanol, (I), With NaOH

EXAMPLE 7

Two kg. of crude isobutylated glycerol α-monochlorohydrin containing 1305 g. (7.83 m.) of I, 13.6 g. (0.81 m.) of II, 426 g. (1.91 m.) of III and 126 g. of polyepichlorohydrin products and made as described above was stirred overnight at room temperature with a 20% by weight aqueous solution of 8.4 m. of NaOH. The aqueous phase was then separated and extracted twice with 500 cc. of toluene. The toluene extract was added to the organic phase and the latter then extracted three times with 250 cc. of water. The final wash water was neutral and free of NaCl. The oil layer was then distilled under reduced pressure to yield 7.64 m. of tert.-butyl glycidyl ether, 0.715 m. of II, 1.89 m. of III and 70 g. of residue. This represents a yield of 97.5% of glycidyl ether and shows that II and III are essentially inert to NaOH under those conditions.

EXAMPLE 8

A kettle was charged with 735 lbs. of crude isobutylated glycerol monochlorohydrin containing 3.39 moles of 1-tert.-butoxy-3-chloro-2-propanol, 500 lbs. of 35.2% NaOH (4.4 moles), 277 lbs. of wash water from an earlier run and 14 gallons of deionized water. Cooling water was maintained on the jacket throughout the run so as to hold the temperature at 23°–25°C.

After 16 hours, VPC analysis of the oil phase showed no unreacted 1-tert.-butoxy-3-chloro-2-propanol. The two phases were separated and the oil phase washed 3 times with 10 gal. of water each time. The three wash waters were combined, a sample extracted with $CH_2Cl_2$ and the extract assayed by VPC. This showed the water extract contained 11.2 lbs. of tert.-butyl glycidyl ether and 9 lbs. of highers.

The final oil layer weighed 741 lbs. and assayed as follows:

| Compound | Lbs. |
|---|---|
| Toluene | 76.3 |
| tert.-Butyl glycidyl ether | 427.26 |
| II | 61.0 |
| III | 137.4 |
| Polymer | 39.0 |

Total tert.-butyl glycidyl ether, 438.5 lbs. = 3.37 moles. Yield based on 1-tert.-butoxy-3-chloro-2-propanol taken, 99.5%.

We claim:
1. The process for making tertiary-butyl glycidyl ether comprising
   1. butylating a glycerol α-monohalohydrin by reaction with isobutylene, thus to produce a mixture of the 1- and 2-tert.-butyl monoethers and the 1,2-di-(tert.-butyl ether) of the halohydrin;
   2. selectively dehydrohalogenating the 1-monoether by reaction with a dehydrohalogenating agent, thus to produce tert.-butyl glycidyl ether; and
   3. separating the glycidyl ether from the remaining halohydrin ethers and recycling the latter to Step (1).

2. The process of claim 1 wherein wthe halohydrin is chlorohydrin.

3. The process of claim 1 wherein the dehydrohalogenating agent is an alkali or alkaline earth metal hydroxide.

4. The process of claim 1 wherein glycerol α-monochlorohydrin is reacted with isobutylene and the resulting mixture of ethers is dehydrochlorinated by reaction with aqueous sodium hydroxide.

* * * * *

UNITED STATES PATENT OFFICE
CERTIFICATE OF CORRECTION

PATENT NO. : 3,878,227
DATED : April 15, 1975
INVENTOR(S) : A. R. Sexton and F. P. Corson It is certified that error appears in the above-identified patent and that said Letters Patent are hereby corrected as shown below:

Column 1, line 43, delete "effective" and insert --effected--;

Column 2, line 50, delete "(11)" and insert --(1)--;

Column 5, line 29, delete "13.6 g." and insert --135.6 g.--;

Column 5, line 43, delete "those" and insert --these--.

Signed and Sealed this twenty-ninth Day of July 1975

[SEAL]

Attest:

RUTH C. MASON
Attesting Officer

C. MARSHALL DANN
Commissioner of Patents and Trademarks